United States Patent [19]
Lanser et al.

[11] Patent Number: 5,329,430
[45] Date of Patent: Jul. 12, 1994

[54] LIGHT CONTROL CIRCUIT FOR VANITY MIRROR ASSEMBLY AND METHOD OF MANUFACTURING

[75] Inventors: Michael L. Lanser; Paul T. Vander Kuyl, both of Holland, Mich.

[73] Assignee: Prince Corporation, Holland, Mich.

[21] Appl. No.: 879,207

[22] Filed: May 5, 1992

[51] Int. Cl.⁵ .................................................. B60R 1/12
[52] U.S. Cl. ................................. 362/83.1; 362/144; 362/295
[58] Field of Search .................. 362/83.1, 144, 295

[56] References Cited

U.S. PATENT DOCUMENTS

| | | | |
|---|---|---|---|
| 3,876,967 | 4/1975 | Hehl et al. | 338/126 |
| 4,000,404 | 12/1976 | Marcus | 362/83.1 |
| 4,227,242 | 10/1980 | Marcus | 362/61 |
| 4,271,408 | 6/1981 | Teshima et al. | 340/702 |
| 4,435,691 | 3/1984 | Ginn | 338/125 |
| 4,500,131 | 2/1985 | Fleming | 296/97 K |
| 4,586,788 | 5/1986 | Hansen | 296/97 B |
| 4,744,645 | 5/1988 | Sharp | 362/144 X |
| 4,760,503 | 7/1988 | VandenBerge et al. | 362/137 |
| 4,879,637 | 11/1989 | Clark et al. | 362/141 |
| 4,908,740 | 3/1990 | Hudgins et al. | 362/83.1 X |
| 5,091,831 | 2/1992 | Van Order et al. | 362/74 |
| 5,162,950 | 11/1992 | Suman et al. | 359/871 |
| 5,205,635 | 4/1993 | Van Order et al. | 362/83.1 |
| 5,278,736 | 1/1994 | Falcoff et al. | 362/144 X |

Primary Examiner—Stephen F. Husar
Attorney, Agent, or Firm—Price Heneveld Cooper DeWitt & Litton

[57] ABSTRACT

A dimming control circuit for use in an illuminated vanity mirror includes a surface formed variable resistor on a conductive circuit substrate and wiper contacts engaging the resistor. One of the resistor and wiper contacts is movably mounted to a mirror frame with the other of the resistor and wiper contacts being stationary such that the resistance can be varied to control the light intensity.

16 Claims, 3 Drawing Sheets

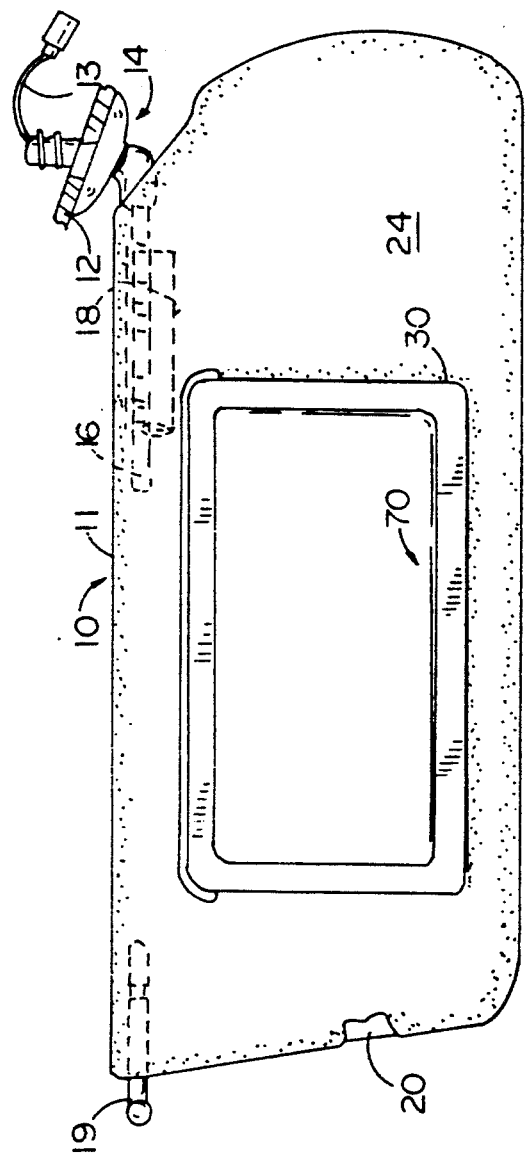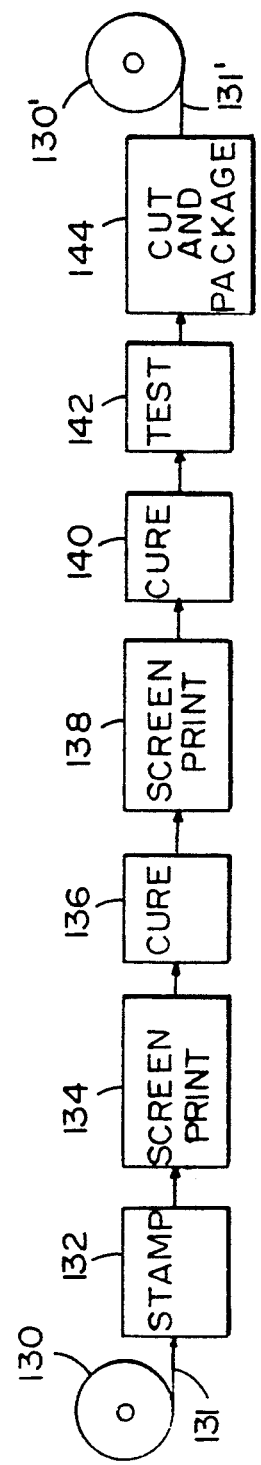

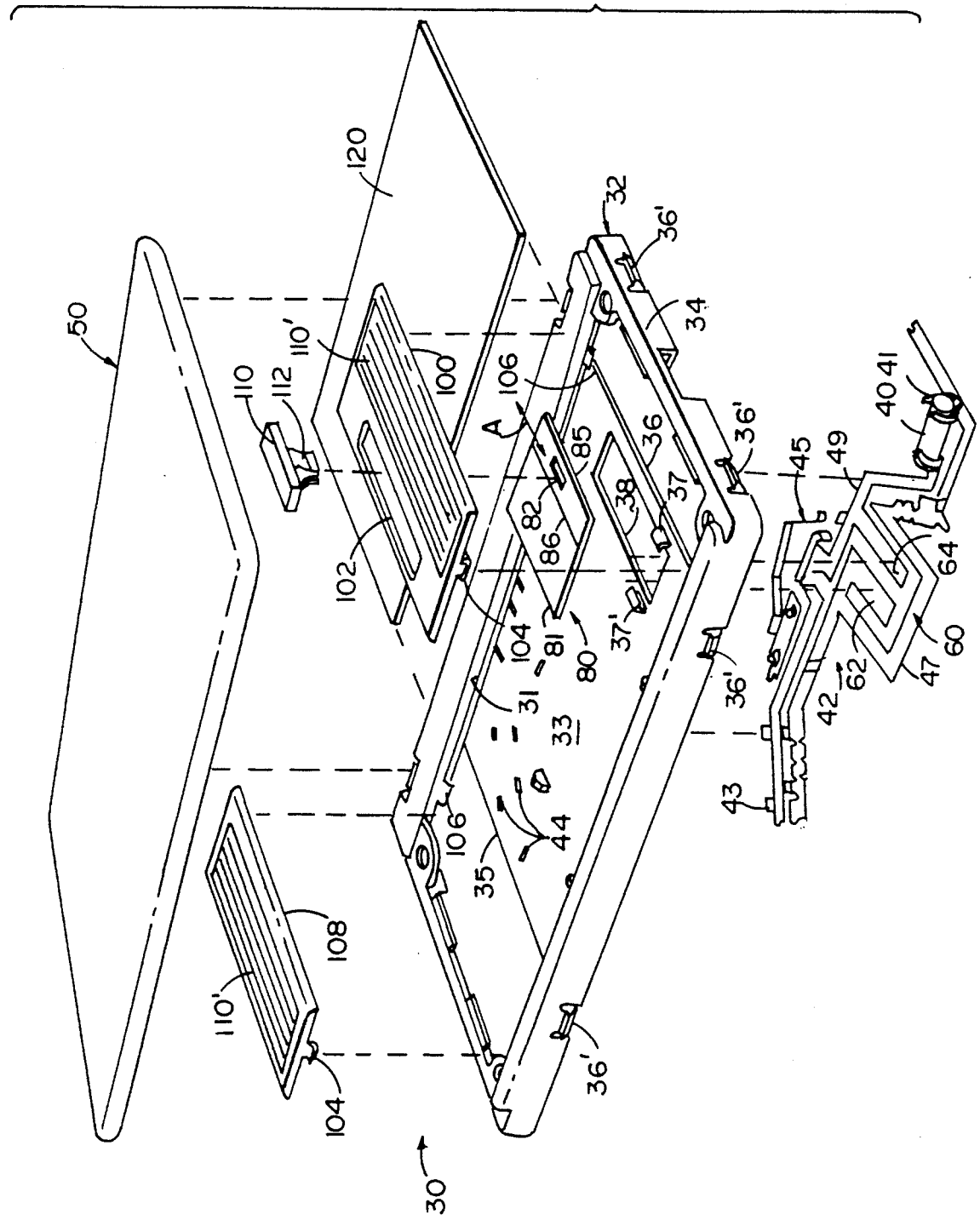

LIGHT CONTROL CIRCUIT FOR VANITY MIRROR ASSEMBLY AND METHOD OF MANUFACTURING

BACKGROUND OF THE INVENTION

The present invention relates to a light control circuit for an illuminated vanity mirror assembly and particularly to a dimming circuit and a method of manufacturing the same.

Illuminated vanity mirror assemblies are frequently installed in visors for vehicles. U.S. Pat. No. 4,000,404 discloses such a system including, in FIG. 15 thereof, a dimming control for providing variable adjustment of the light intensity from the lamps associated with the vanity mirror. The system disclosed is relatively expensive requiring several solid state circuit elements in addition to a variable resistor for providing the dimming control. The utilization of a conventional rheostat, although providing desired dimming, adds considerable bulk and/or expense to a dimming control and can provide a relatively concentrated source of heat which could result in damage to the typically polymeric core utilized in the manufacture of the vanity. Other dimming controls for a vanity mirror installed in a visor are disclosed in U.S. Pat. No. 4,586,788 showing a dimming switch to assure that when the covered vanity mirror is opened, it is always opened in the dim position and U.S. Pat. No. 4,227,242 showing a dimming control as a function of cover movement. The latter two patents provide dimming control primarily to assure that when the cover is opened on the covered vanity mirror assembly, the user is not temporarily blinded by the high intensity of the light.

U.S. Pat. No. 4,879,637 provides a vanity mirror having a frame and an insulated circuit board with a conductor and screen printed resistor thereon. Wiper contacts selectively engage the resistor and conductor to provide a variable resistance coupled with lamp means for providing an adjustable current supplied to the lamps from the vehicle's power supply to control the light intensity. U.S. Pat. No. 4,744,645 discloses a vanity mirror with a circuit also printed on a insulative substrate which is a polymeric film and which includes an adhesive layer for attaching the film to the mirror back. The circuit includes a resistor and a wiper arm for dimming lamps associated with a vanity mirror package for use with a visor.

SUMMARY OF THE PRESENT INVENTION

The dimming control system of the present invention provides a circuit for adjusting the light level from lamps associated with an illuminated vanity mirror and one particularly for use in connection with the covered vanity mirror-type visor for use in a vehicle. It avoids the complexity and cost of prior art dimming circuits as well as the problems associated with a bulky discrete variable resistor by eliminating the use of a conventional circuit board or film substrate by using a conductive substrate on which a screen-printed resistor is formed. The cost of such a system is reduced thus by the elimination of the insulative substrate and further by the unique continuous web processing of circuits from a roll of conductive material. The web of conductive material passes through multiple printing and curing stations which print an insulator and overlying resistor onto the conductive substrate to form an electrical dimming circuit. These and other features, objects and advantages of the present invention will become apparent upon reading the following description thereof together with reference to the accompanying drawings in which:

BRIEF DESCRIPTION OF THE DRAWINGS

FIG. 1 is a perspective view of an illuminated vanity mirror visor embodying the present invention;

FIG. 2 is an exploded fragmentary perspective view of the illuminated vanity mirror assembly shown in FIG. 1;

FIG. 7 is a flow diagram in block form illustrating the method and apparatus for manufacturing the circuit of the present invention.

DETAILED DESCRIPTION OF THE PREFERRED EMBODIMENT

Figure 3:
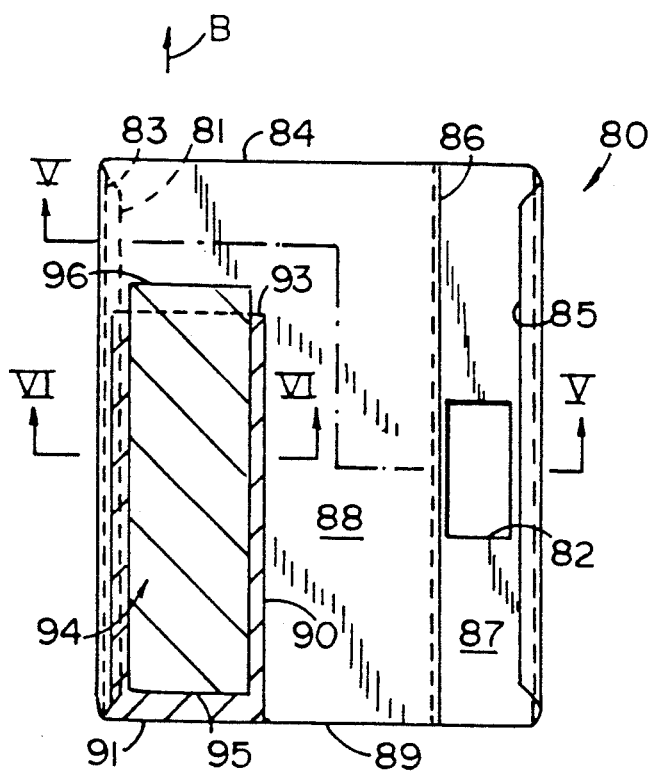
FIG. 3 is a front elevational view of the circuit of the present invention.

Referring initially to FIG. 1, there is shown a visor 10 mounted to the roof support 12 of a vehicle such as an automobile by a conventional elbow bracket pivot assembly 14. Assembly 14 includes a hollow horizontal axle 16 extending within the body of the visor near an upper edge 11 thereof. An electrical conductor 13 extends through the axle for providing a positive supply conductor to the illuminated vanity mirror assembly 30 with the connection of the metallic elbow 14 to the metallic roof providing the ground connection.

Visor 10 pivots on axle 16 by means of an internal torque device 18 which can be of the type described in U.S. Pat. No. 4,500,131 issued Feb. 19, 1985, and entitled VISOR CONTROL. This permits the visor 10 to be moved from a raised stored position against the vehicle headliner when not in use or pivoted downwardly to a lowered use position. The left edge of the visor remote from pivot connection 14 includes a stub axle 19 which fits within a suitable clip mounted to the vehicle for supporting the opposite end of the visor.

Visor 10 includes a body made of a polymeric core 20 typically molded in two halves which can be hinged together and which includes a generally rectangular recess centrally located in one side thereof for receiving an illuminated vanity mirror assembly 30. The visor core 20 is covered by a suitable upholstery material 24 to conform the visor appearance to that of the interior of a vehicle in which it is installed. The construction of the illuminated vanity mirror assembly 30 and the unique dimming light control circuit of the present invention is best understood initially by reference to FIG. 2 now described.

Vanity mirror assembly 30 includes a generally rectangular mirror frame 32 having a downwardly projecting peripheral wall 34 with outwardly projecting tabs 36' for snap-fitting the frame 32 within the body of the visor. Frame 32 includes a snap-in floor 33 which is shorter than the frame 32 to define rectangular apertures 35 and 36 at opposite edges into which lamps 40 (one shown) are centered. The lamps are mounted onto a stamped electrical circuit 42 including sockets 41 at opposite ends of conductors 47 and 49 thereof for receiving lamps 40. The electrical circuit 42 defines an electrical current flow path for bulbs 40 as described in greater detail below in U.S. Pat. No. 4,879,637, the disclosure of which is incorporated herein by reference.

Circuit 42 further integrally includes contact assembly 60 with upwardly extending contact fingers 62 and 64 extending from conductors 47 and 49 respectively. Circuit 42 including the lamp sockets and contact fingers, is mounted to the undersurface of frame 32 by means of suitable tabs 43 which extend through aligned slots 44 formed in floor 33 and subsequently are bent to hold the circuit in place. Alternatively, conductors 47 and 49 may include small apertures through which posts on the polymeric substrate 33 extend and are heat staked to mount circuit 42 to board 33. An electrical switch 45 is stamped as part of the electrical circuit 42 and is of the type which cooperates with cover 50 of the assembly in the same manner as disclosed in U.S. Pat. No. 4,760,503, issued on Jul. 26, 1988, to VandenBerge et al., the disclosure of which is incorporated herein by reference. When circuit 42 is mounted to board 33, contact fingers 62 and 64 extend upwardly through aperture 38 in board 33 for engaging the underside of circuit 80 as described below.

Movably positioned to slide in a direction indicated by Arrow A in FIG. 2 is the circuit 80 of the present invention which is slidably mounted by a plurality of generally inverted L-shaped guides 37 and 37' extending upwardly and inwardly from floor 33. Circuit 80 overlies wiper contacts 62 and 64 and includes a conductive substrate with a surface formed resistor thereon both of which selectively engage the wiper contacts as described in greater detail below.

Overlying circuit 80 is a first lens 100 including a slot 102 formed therein for allowing a knob 110 with a snap fitting projection 112 to extend downwardly through the lens and interlocks with slot 82 in circuit 80 for controlling the sliding movement of the circuit. Lens 100 includes tabs 104 at opposite ends for snap fitting the lens into apertures 106 in the bottom corners of frame 32. The left side of the vanity mirror frame likewise includes a lens 108 which, like lens 100, includes a plurality of lens forming facets 110' for directing light generally inwardly toward the center of the face of the user of the vanity mirror. The frame 32 and lens 100 are made of a polymeric material such as polycarbonate, ABS or other suitable material for the automotive environment and are therefore electrically insulative and do not interfere with the conductive substrate 84 (FIGS. 3-6) of circuit 80 when mounted to the frame.

Mounted between the lenses is a vanity mirror 120 which rests on a peripheral flange 31 of frame 32 and which is held in place at opposite ends by a flange on the inside edge of each of the snap-fitted lenses 100 and 108. Cover 50 includes sockets which snap fit over axle members 52 and 54 of frame 32 as described in U.S. Pat. No. 4,760,503 to provide a snap-open and snap-closed operation of the cover for selective use of the illuminated vanity mirror. Having described the major components of the system in connection with the diagram of FIG. 2, a detailed description of the circuit is presented in connection with FIGS. 3-6 and the circuit manufacturing process in connection with FIG. 7 which follows.

Figure 4:
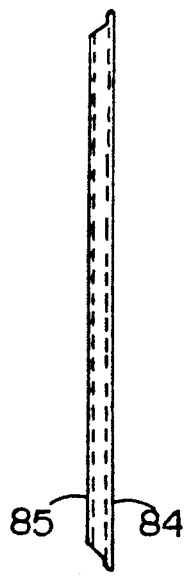
FIG. 4 is a right side elevational view of the circuit shown in FIG. 3.
Figure 5:
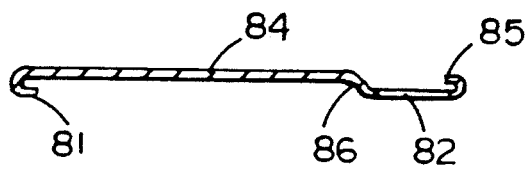
FIG. 5 is a cross-sectional view of the circuit taken along section line V—V in FIG. 3.
Figure 6:
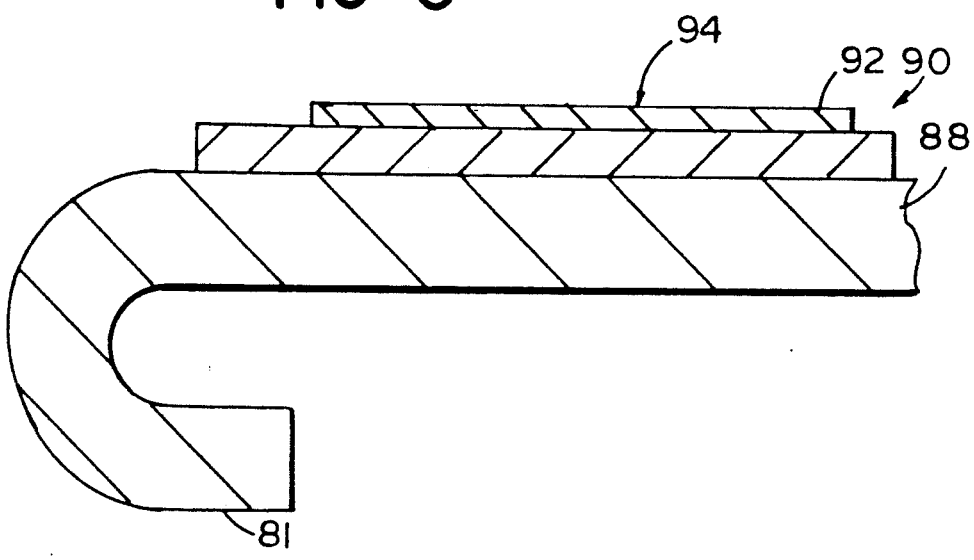
FIG. 6 is a greatly enlarged fragmentary cross-sectional view of the circuit taken along section line VI—VI in FIG. 3.

Referring to FIGS. 3-6, there is shown the circuit 80 of the present invention which defines the body of a variable resistance which is electrically completed by the wiper contacts 62 and 64 (FIG. 2). Circuit 80 includes a substrate 84 which is stamped from a conductive material, such as brass and which is relatively thin having a thickness of approximately 0.015 inches. Other materials such as copper or tin plate could likewise be used as long as the substrate 84 is conductive and provides structural support for the remaining circuit elements and for coupling to the control knob 110. Substrate 84 includes, as best seen in FIGS. 3 and 6, a left edge 81 which is curved over in a J-shaped configuration by roll-forming and has inwardly tapered upper and lower corners 83. Similarly, the right edge of substrate 84 as viewed in FIG. 3 includes J-shaped curved edge 85 curved in a direction opposite edge 81 to define a raised land 87 in connection with a step 86 which is formed in longitudinal alignment between the parallel opposite edges of the generally rectangular substrate 84 to define the land 87 and also align the opposite sides of curved ends 81 and 85 in substantially the same planes as best seen in FIGS. 4 and 5. A notch 82 is formed in the center of raised land 87 for receiving the tip 112 of knob 110 with the raised 87 land providing clearance for tip 112 once installed. Thus, a relatively thin conductive substrate 84 can be employed and is formed to provide an apparent thickness of that of a conventional fiber resin circuit board and therefore can be directly substituted for the now commercially available circuit board construction disclosed in the above identified U.S. Pat. No. 4,879,637. Thus, by the unique shaping of the conductive substrate 84, a further cost reduction is achieved since no new tooling for the remaining elements of the visor assembly is necessary.

Printed on the lower left corner of the substrate 84 as described in greater detail below in connection with FIG. 7, is a generally rectangular thin pad of insulative material 90 which lies on the surface 88 of substrate 80 as best seen in FIG. 6. The insulative layer 90 can be a screen printed polyester ink having a thickness of approximately 0.002 inches and a commercially available UV 8500 manufactured by Minico/Asahi America Corporation of Congers, N.Y., or an equivalent material can be employed. This material provides the desired insulative characteristics for circuit 80 as well as the screen printability of the material during the manufacturing process.

Overlying a substantial surface area of the top surface 92 of insulative layer 90 is a layer of resistance material 94 which is spaced at its bottom edge 95 slightly above the lower edge 89 of substrate 84 and the lower edge 91 of insulative layer 90 which is co-linear with edge 89 of substrate 84. The upper edge 96 of resistance layer 94, however, overlaps and extends above the upper edge 93 of insulative layer 90 and directly contacts surface 88 of conductive substrate 84 and makes electrical contact therewith. Resistance layer 94 is, in the preferred embodiment, a screen printed carbon based resistance ink having a thickness of approximately 0.001 inches and preferably a resistivity of 20 ohms per square to provide a variable resistance between 60 and 0 ohms in the preferred embodiment of the invention as the wiper contact assembly 60 is moved from maximum resistance position at the lower edge of circuit 80, as seen in FIG. 3, to a minimum full-on position above the upper edge 96 of resistance layer 94. The carbon based resistance ink is a commercially available material such as model No. M-3021-RS or M-2020-PRS also available from Minico/Asahi America.

As seen in FIG. 2, the wiper assembly 60 includes a pair of spaced contact fingers 62 and 64 which have flexible tips which are spaced to ride over the circuit 80 such that leg 64 is centered and aligned over resistive layer 94 while leg 62 rides over the conductive substrate 84 in the rectangular space between insulative layer 90 and step 86 as viewed in FIG. 3. As viewed in FIG. 2, therefore, circuit 80 is shown in an inverted position as compared to FIG. 3 which shows the reverse side of the circuit 80. As noted above, the contact assembly 60 is stationary while circuit 80 is moved by the intercoupling of knob 110 within notch 82 of circuit substrate 84. The wiper contacts 62 and 64, when in the maximum brightness position, both ride on the rectangular area of the conductive substrate 84 above the upper edge 96 of resistance layer 94. As the circuit board is moved upwardly in a direction shown by arrow B in FIG. 3 with respect to the fixed contacts 62 and 64, wiper contact 62 continues to ride on the conductive substrate but contact 64 increasingly rides downwardly along resistance layer 94 to increase the resistance as the contact point extends from end 96 until it reaches a maximum resistance near its lower end 95. This variable resistance is coupled in series circuit with lamps 40 as described in the above identified '637 patent to selectively control the intensity of the illumination from these lamps. Thus, as knob 110 and circuit 80 coupled thereto is moved up and down in a direction indicated by arrow A in FIG. 2, the brightness is increased and decreased when switch 45 is in a closed position with cover 50 opened. Having described the circuit 80 of the present invention, a description of the manufacturing process which further reduces the cost and increases the reliability of the circuit of the present invention is presented in connection with FIG. 7.

Referring now to FIG. 7, there is shown a flow diagram of the processing equipment location for the continuous manufacturing of circuits 80 according to the present invention. In FIG. 7, a roll of web stock brass material 130 is fed by conventional conveying means to a stamping press and roll-forming machine which cuts and forms the substrate shape 84 shown in FIGS. 3-6 as indicated by step 132. It does so from the web 131 of continuous material while leaving sufficient bridges of material between the continuous web 131 and the formed circuit substrate 84 to allow the web 131 to continue carrying the circuit throughout the remaining processing stations. The continuous web of series aligned circuit substrates is then fed into a screen printing press for printing the generally rectangular layer 90 of insulative material such as the polyester ink to a thickness of approximately 0.002 inches as indicated by step 134.

Next, the web carrying the series of circuit substrates are transported to a curing oven which constitutes, in the preferred embodiment, an ultraviolet light source for curing the polyester ink as indicated by step 136. The web 131 of conductive material then enters a second screen press in which the rectangular layer of resistance ink 94 is screen printed over the top of polyester layer 90 and in direct electrical and mechanical contact at one end 96 with the surface 88 of conductive substrate 84 as shown in step 138. The web then travels through a curing oven to cure the resistive ink as indicated by step 140. With a web speed of approximately 40 inches per minute, the oven has a length of approximately 200 inches to allow five minutes of curing time under the infrared heaters used in the oven. Next, the web 131, now with the resistor printed thereon, is moved to a test station in which electrical contacts are applied to the now circuit 80 moved to determine whether the resistance range extends between 0 and 60 ohms in the preferred embodiment with a continuous change in resistance as indicated by step 142. If the circuits pass the test, they proceed to a cutting and packing station as indicated by step 144. If the test indicates a bad circuit it can be ejected from the remainder of the web by a suitable ejection arm. Likewise, a defective part can be identified by suitable markers such as a spray of paint or the like so that it can be visually identified and not assembled into a vanity mirror assembly.

Once a part has passed test station 142, the circuit 80 is then cut from the now substantially empty web 131' and is retrieved on a take-up. spool 130'. Cutting station 144 may also include a laterally extending conveying means which package the generally rectangular circuits 80 into a carrier for a subsequent assembly process for inserting the circuit in the visor assembly.

Thus, with the method of manufacturing shown and described in connection with FIG. 7, approximately 20 circuits per minute can be manufactured from a continuous web 131 of conductive stock and the circuit manufacturing completed, tested, and packaged on a single continuous line.

It will become apparent to those skilled in the art that various modifications to the specific circuit layer materials and types of equipment used in connection with the manufacturing process can be made without departing from the spirit or scope of the invention as defined in the appended claims.

The embodiments of the invention in which an exclusive property or privilege is claimed are defined as follows:

1. An illuminated vanity mirror assembly including a variable resistance circuit for providing a dimming control comprising:
   a conductive electrical circuit substrate having an insulating layer of material and a resistance layer of material on at least one side of said substrate with said layer of insulating material being in direct contact with said substrate and said layer of resistance material overlaying said insulating layer and having an end extending beyond said insulating layer and in contact with said substrate;
   electrical contact means for selectively engaging said resistance material;
   means for mounting said substrate and said contact means for movement relative to each other to provide a variable resistance to said contact means; and
   means for electrically coupling said contact means to lamp means associated with a vanity mirror for selectively varying the intensity of light from said lamp means.

2. The assembly as defined in claim 1 wherein said insulating layer is printed onto said substrate.

3. The assembly as defined in claim 2 wherein said resistive layer is printed onto said insulating layer and said substrate.

4. The assembly as defined in claim 3 wherein the illuminated vanity mirror assembly includes a frame and means for mounting said contacts and said substrate to said frame for movement with respect to one another.

5. The assembly as defined in claim 4 wherein said frame includes means for fixedly attaching said contacts and means for slidably moving said substrate with respect to said contacts.

6. The assembly as defined in claim 5 and further including a visor for use in connection with a vehicle and wherein said frame including said illuminated vanity mirror is mounted to said visor.

7. An illuminated vanity mirror assembly including an electrical circuit having a variable resistance body comprising:

a conductive supporting substrate of relatively thin material with opposite edges formed to provide a predetermined overall thickness for said substrate;

a layer of insulating material formed on said substrate; and a resistance layer formed on said layer of insulating material and overlying an edge of said insulating material to contact said substrate to form the body of a variable resistor.

8. The assembly as defined in claim 7 wherein said opposite edges of said substrate are bent over in a generally J-shaped configuration in opposite directions from one another and said substrate includes a step formed in spaced relationship with one of said opposite edges such that a raised platform is defined thereby.

9. The assembly as defined in claim 8 wherein said substrate includes a notch in said platform for receiving a control element for moving said substrate.

10. The assembly as defined in claim 9 and further including contact means for engaging said resistance layer and said substrate adjacent said resistance layer and means for mounting said contact means and said substrate for movement with respect to one another.

11. The assembly as defined in claim 10 wherein said resistance layer and said insulating layer are printed onto said substrate.

12. An illuminated vanity mirror assembly including a variable resistance circuit for providing a dimming control comprising:

a conductive supporting substrate of relatively thin material with opposite edges formed to provide a predetermined overall thickness for said substrate;

a layer of insulating material formed on said substrate;

a resistance layer formed on said layer of insulating material and overlying an edge of said insulating material to contact said substrate to form the body of a variable resistor;

electrical contact means for selectively engaging said resistance material;

means for mounting said substrate and said contact means for movement relative to each other to provide a variable resistance to said contact means; and means for electrically coupling said contact means to lamp means associated with a vanity mirror for selectively varying the intensity of light from said lamp means.

13. The assembly as defined in claim 12 wherein said opposite edges of said substrate are formed in a generally J-shaped configuration in opposite directions from one another and said substrate includes a step formed in spaced relationship with one of said opposite edges such that a raised platform is defined thereby.

14. The assembly as defined in claim 13 wherein said substrate includes a notch in said platform for receiving a control element for moving said substrate.

15. The assembly as defined in claim 14 and further including contact means for engaging said resistance layer and said substrate adjacent said resistance layer and means for mounting said contact means and said substrate for movement with respect to one another.

16. The assembly as defined in claim 15 wherein said resistance layer and said insulating layer are printed onto said substrate.

* * * * *